United States Patent
Etoh

(10) Patent No.: US 7,333,146 B1
(45) Date of Patent: Feb. 19, 2008

(54) IMAGE CAPTURING APPARATUS FOR ADJUSTING A RELATIVE POSITION BETWEEN AN IMAGE SENSOR AND AN OPTICAL AXIS

(75) Inventor: Takeharu Etoh, 21-2, Aomatanihigashi 7-chome, Mino-shi, Osaka 562-0022 (JP)

(73) Assignees: Takeharu Etoh, Osaka (JP); Shimadzu Corporation, Kyoto (JP)

( * ) Notice: Subject to any disclaimer, the term of this patent is extended or adjusted under 35 U.S.C. 154(b) by 1147 days.

(21) Appl. No.: 10/089,617

(22) PCT Filed: Sep. 28, 2000

(86) PCT No.: PCT/JP00/06701

§ 371 (c)(1),
(2), (4) Date: Apr. 29, 2002

(87) PCT Pub. No.: WO01/26365

PCT Pub. Date: Apr. 12, 2001

(30) Foreign Application Priority Data

Oct. 2, 1999 (JP) ................................. 11-377472

(51) Int. Cl.
*H04N 5/225* (2006.01)
(52) U.S. Cl. ..................................... 348/374; 348/335
(58) Field of Classification Search ................ 348/374, 348/335
See application file for complete search history.

(56) References Cited

U.S. PATENT DOCUMENTS

| | | | |
|---|---|---|---|
| 5,051,798 A * | 9/1991 | Kimura | 257/229 |
| 5,355,165 A | 10/1994 | Kosonocky et al. | |
| 5,436,661 A * | 7/1995 | Yamamoto et al. | 348/264 |
| 5,508,740 A * | 4/1996 | Miyaguchi et al. | 348/244 |
| 5,731,834 A * | 3/1998 | Huot et al. | 348/374 |
| 5,811,799 A * | 9/1998 | Wu | 250/239 |
| 5,969,759 A | 10/1999 | Morimoto | |
| 6,236,430 B1 * | 5/2001 | Suzuki et al. | 348/219.1 |
| 6,665,013 B1 * | 12/2003 | Fossum et al. | 348/308 |
| 6,765,615 B1 * | 7/2004 | Chen et al. | 348/312 |
| 6,803,949 B1 * | 10/2004 | Kitagawa | 348/223.1 |

FOREIGN PATENT DOCUMENTS

| | | |
|---|---|---|
| JP | 4-68873 A | 3/1992 |
| JP | 4-57971 U | 5/1992 |
| JP | 6-217206 A | 8/1994 |
| JP | 7-222067 A | 8/1995 |
| JP | 2000-101058 A | 4/2000 |
| WO | WO 98/03011 A1 | 1/1998 |
| WO | WO 00/51345 A1 | 8/2000 |

* cited by examiner

*Primary Examiner*—Tuan Ho
*Assistant Examiner*—Anthony J Daniels
(74) *Attorney, Agent, or Firm*—Birch, Stewart, Kolasch & Birch, LLP

(57) ABSTRACT

The image sensor 52 is provided with a chip 53 having a image capturing surface 31 and a packaged to which the chip 53 is attached. The image capturing surface include a plurality of blocks 31a to 31d. Each of blocks 31a to 31d has image information read-out lines 39. A position adjustment mechanism 55 is provided, which changes relative positions of the image capturing area 31 of the image sensor 52 and an optical axis 60 of an incident light from an optical system 51 to the image capturing area 31, by ½ a longitudinal and lateral length of the blocks 31a to 31d.

4 Claims, 11 Drawing Sheets

IMAGE CAPTURING APPARATUS FOR ADJUSTING A RELATIVE POSITION BETWEEN AN IMAGE SENSOR AND AN OPTICAL AXIS

TECHNICAL FIELD

The present invention relates to an image capturing apparatus and an image sensor suitable for scientific and technological measurements.

BACKGROUND ART

IC chips rapidly decrease in the yield rate at the time of manufacture as they increase in size. For example, in a case where the yield rate, which is the ratio of the total number of usable IC chips to the total number of manufactured IC chips, is 50%, when the area of the IC chips is doubled, the yield rate is ½ squared, that is, ¼. When the area of the IC chips is quadrupled, the yield rate is ½ to the fourth power, that is, 1/16. Therefore, when one chip costs 100,000 yen, a chip having a quadruple area costs as high as 1,600,000 yen.

In the case of normal IC chips, a chip having substantially the same function as a quadruple-area chip can be manufactured by simply arranging four separately manufactured usable chips. However, to manufacture an image sensor having a quadruple area, it is necessary to join the image capturing areas so that no line appears on the reproduced images, which requires a high technology.

A technology for manufacturing a large-area image sensor by arranging image sensors has already been used, and such an image sensor is called a buttable image sensor. For example, in scientific field such as astronomy in which large-area image sensors are required, allowing the demarcation lines between blocks to appear on the reproduced images, very-large-area image sensors are manufactured by the buttable image sensor technology.

On the other hand, some image sensors are of a parallel read-out type intended for high-speed read-out and the like. In this type, the image capturing area is divided into a plurality of blocks, an image information read-out line is provided for each block, and the image information is read out to the outside of the image sensor in parallel.

For example, by dividing the image capturing area of a chip into four blocks along the longitudinal and lateral demarcation lines so that each block functions independently, even when one of these blocks has a significant defect that makes image capturing substantially impossible, image capturing can be performed by the other blocks. Therefore, if at least one of the four blocks is normal, by performing image capturing with only the image capturing possible block, the chip can be used as an image sensor with a small number of pixels. Moreover, by cutting the chip so as to include the image capturing possible block, the normal block can be used without waste.

Even though the cut chip is different in size, the external control circuit for controlling the image sensor is the same. By making it possible to replace such image sensors with different sizes and similar control manners, the range of usability of one image capturing apparatus can be increased. Such an image capturing apparatus with a replaceable image sensor is disclosed in Japanese Laid-Open Patent Application No. H04-68873 of the present inventor.

DISCLOSURE OF INVENTION

As shown in FIG. 11, in the case of a chip 10 of an image sensor with the image capturing area comprising upper and lower four blocks, the number of patterns of the presence or absence of defects in the blocks is sixteen. Of these patterns, fifteen patterns have at least one normal block 11 (shown by "○") having no defect that is critical or makes image capturing impossible. In FIG. 10, a block 12 having a defect that is critical or makes image capturing impossible is shown by "×".

When only one block 11 of the four blocks has a defect as shown in FIG. 12, the chip can be used in the following two ways: One is to use the chip as an image sensor having a rectangular image capturing area without cutting the chip 10 and without using one block 12 (hatched in FIG. 12) of the three blocks having no defect. The other is to cut the image sensor 10 in half, use one part as a small-area square chip 10' and use the other part as a rectangular image sensor 10". However, when an electric wire for transmitting the driving voltage or the like is provided along a demarcation line between blocks, it is difficult to cut the image sensor 10 along the demarcation line.

If the several kinds of image sensors thus fabricated can be used in a image capturing apparatus by replacing, all the chips can be used without any waste in one image capturing apparatus irrespective of the presence or absence of defects and the defect pattern. In this case, when a chip, all blocks of which are normal, is used, the center of the image capturing area coincides with the optical axis of the incident light from the lens. However, for example, when a chip with three defective blocks and only one normal block is mounted in the same package as it is, the optical axis is situated at a corner point of the image capturing area of a quarter size, so that the symmetry of the screen with respect to the optical axis is lost and strong bad influences of lens distortion and aberration occur. Thus, all the chips cannot be effectively used merely by attaching to the same package a plurality of kinds of chips different in the presence or absence of defects and the defect pattern and then mounting the package in an image capturing apparatus.

Moreover, the above-described image sensor has the following problem: In image sensors, control voltages such as a driving voltage for transmitting image information on the image capturing area is supplied from the outside of the image capturing area. However, when the image capturing area is increased in size, since the distance from the outside to the inside of the image capturing area increases and the necessary electric power increases in proportion to the area, it is difficult to supply electric power necessary for achieving a sufficiently high transfer rate.

The present invention is made to solve the above-mentioned problems of the conventional image sensors. Specifically, a first object of the present invention is to provide an image sensor with an image capturing area comprising a plurality of blocks usable in one image capturing apparatus irrespective of the presence or absence of defects and the defect pattern. A second object of the present invention is to make it possible to supply electric power necessary for achieving a sufficiently high transfer rate when the image capturing area is increased in size.

To achieve the above-mentioned first object, a first aspect of the invention provides an image capturing apparatus comprising: an image sensor provided with a chip having an image capturing area and a package to which the chip is attached, said image capturing area consisting of a plurality of blocks, each of the blocks having image information read-out lines; an optical system for focusing incident light from an object to be captured on the image capturing area of the image sensor; and a position adjustment mechanism for changing a relative position between the image capturing area of the image sensor and an optical axis of the incident light directed from the optical system to the image capturing area, by ½ a longitudinal and lateral length of the blocks.

According to the image capturing apparatus of the first aspect of the invention, both in the case of chips with no block having a defect that is critical or makes image capturing impossible and in the case of chips with at least one block having a defect that is critical, coincidence between the optical axis of the incident light and the center of the image capturing area is obtained. Consequently, using one kind of package and one kind of the image capturing apparatus, chips with at least one block having a defect can be all put to practical use with minimizing so-called eclipse due to the aberrations and diaphragm of lens.

The position adjustment mechanism, for example, displaces the image sensor with respect to the optical axis. The position adjustment mechanism may displace the optical system with respect to the image sensor.

A second aspect of the invention is also for achieving the first object, and provides an image capturing apparatus comprising: an image sensor provided with a chip having an image the four patterns where one of the blocks 31a to 31d has a defect and the two patterns where two of the blocks 31a to 31d have a defect, six patterns in total, two chips 53' and 53" used for separate image sensors can be obtained by cutting the chip 53. The patterns other than these are used without the chip 53 being cut even if any of the blocks 31a and 31d has a defect. For example, when four blocks 31a to 31d have a defect, the chip 53 can be used as an image sensor ¼ in the number of pixels by attaching it to the package 41 without cutting it. Even when two chips can obtained by cutting the chip 53 as described above, the chip 53 can be used as one chip without being cut.

Chips having rectangular image capturing area ½ in the number of pixels include longitudinally elongated ones and laterally elongated ones. However, for example, by attaching a holder to a side part and a lower part of the main body of the image capturing apparatus to form an exterior ornament so that the user does not become aware of the length and the width, no problem arises in practical uses.

Next, the mount attacher 55 will be described.

As shown in FIG. 2, the mount 54 with the image sensor 52 is attached to the image capturing apparatus main body with three screws 61. Nine screw holes 62 are provided for each screw 61. The longitudinal and lateral intervals (pitches) 63 between the screw holes 62 are ½ the longitudinal and lateral width 64 of the blocks 31a to 31d. Therefore, by changing the from the outside to the inside of the image capturing area can be reduced, so that a sufficiently high transfer rate can be achieved even when the image capturing area is increased in size.

It is preferable that the chip is cuttable along another of the demarcation lines between the blocks. In this case, by cutting the chip, all the chips can be effectively used irrespective of the presence or absence of defects and the defect pattern of the blocks.

BEST MODE FOR CARRYING OUT THE INVENTION

Figure 1:
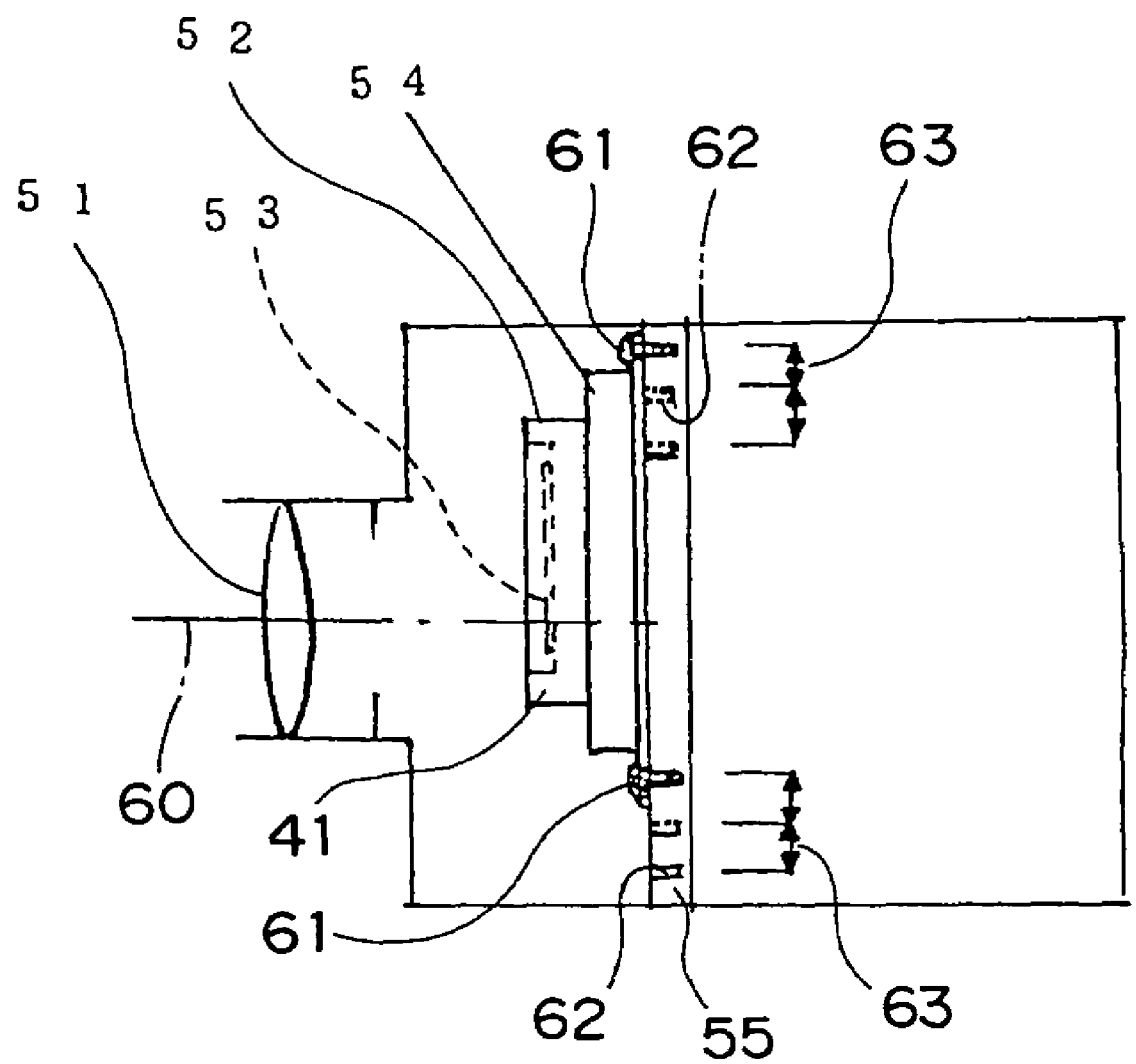
FIG. 1 is a schematic structural view showing an image capturing apparatus of a first embodiment.

Next, embodiments of the present invention shown in the drawings will be described in detail.

First Embodiment

Figure 2:
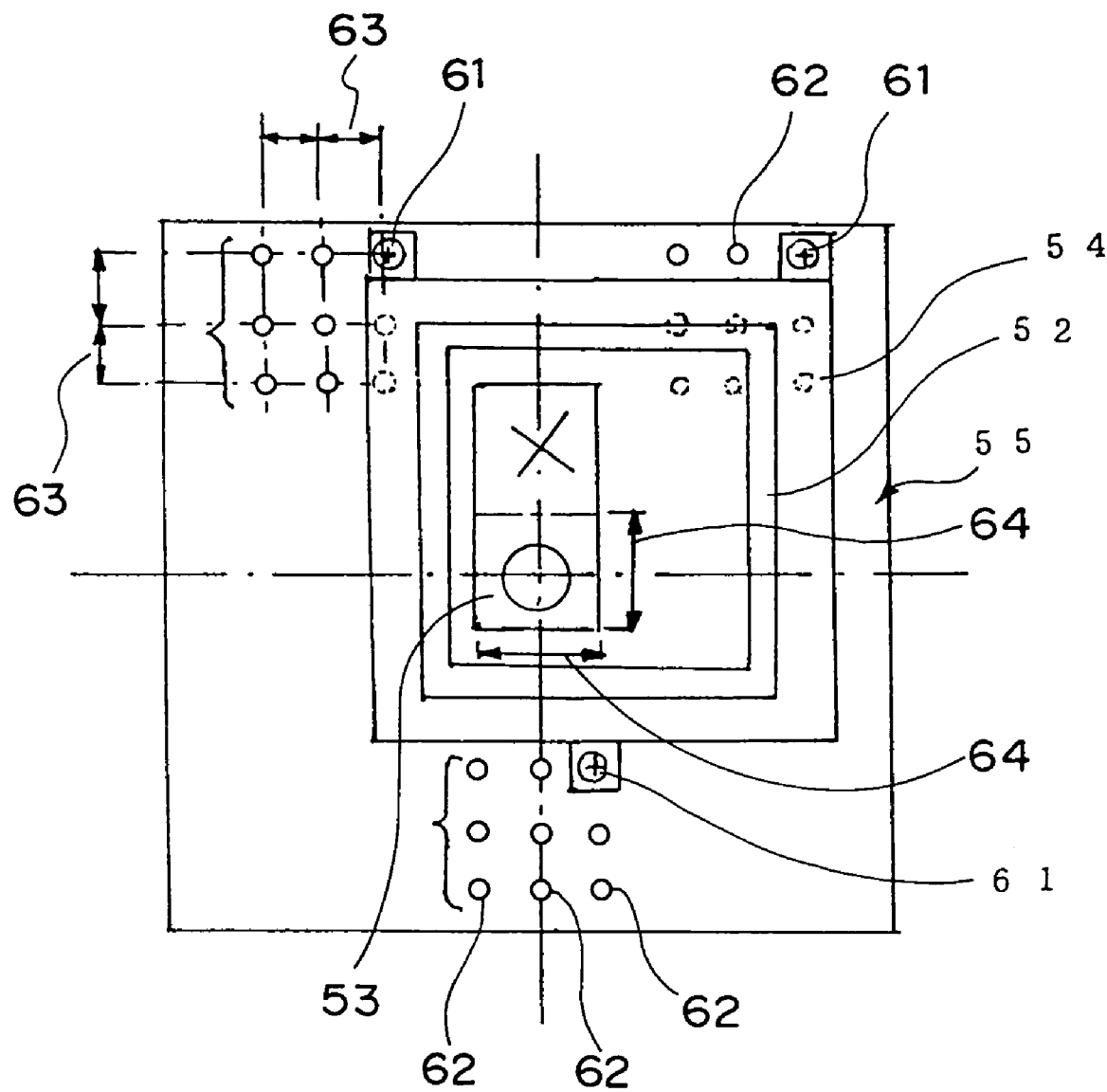
FIG. 2 is a front view showing a position adjustment mechanism.

FIGS. 1 and 2 show an image capturing apparatus of a first embodiment of the present invention. The image capturing apparatus has a lens (optical system) 51 for focusing the incident light from a non-illustrated object to be captured on an image capturing area 31 present on a chip 53 of an image sensor 52. The image sensor 52 has the chip 53 and a package 41 to which the chip 53 is attached. The image sensor 52 is replaceably attached onto a mount 54. The mount 54 is attached to the image capturing apparatus main body by a mount attacher (position adjustment mechanism) 55.

Figure 3:
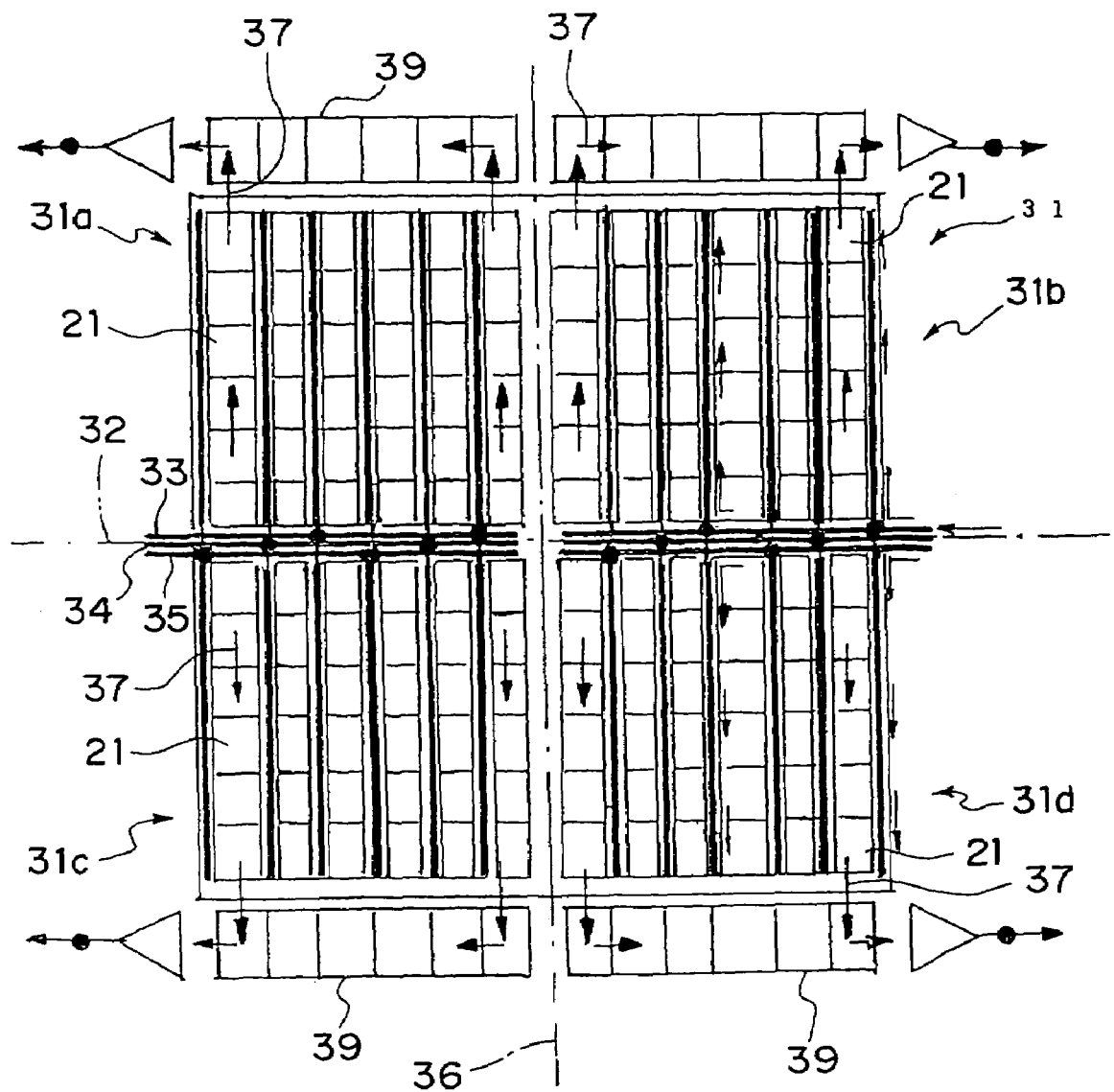
FIG. 3 is a front view showing an image sensor.

FIG. 3 shows the image capturing area 31 of the image sensor 52 of a CCD type. The image capturing area 31 comprises four blocks 31a to 31d. The blocks 31a to 31d are each provided with a plurality of vertical CCDs 21 for photoelectric conversion and transmission of charges (image information) in a vertical direction and a horizontal CCD (image information read-out line) 39 for signal read-out. The charges generated by photoelectric conversion in the blocks 31a to 31d are read out over the path shown by the arrow 30 in FIG. 3.

The vertical CCDs 21 are of a three-phase driving type. Aluminum wires (voltage supply wires) 33, 34 and 35 for supplying the driving voltages to the vertical CCDs 21 are disposed in a region along the horizontal demarcation line 32 between the blocks 31a and 31d. For example, a driving voltage of a first phase is transmitted to the inside of the image capturing area 31 via the aluminum wire 33 and a contact point 38 as shown by the arrows 37. By thus providing the aluminum wires 33, 34 and 35 along the demarcation line 32, the distance for supply of the driving voltages from the outside to the inside of the image capturing area 31 can be reduced, so that the charges can be transferred at a sufficiently high rate even when the image capturing area 31 is increased in size.

The driving voltages may be supplied through a metal wire provided in an upper part or a lower part with respect to the horizontal CCDs 39 for read-out. However, the present embodiment is simpler in structure in that the aluminum wires 33 to 35 do not interlace with other circuits disposed in the periphery of the horizontal CCDs 39. By providing voltage supply wires both in the region along the demarcation line 32 and in the horizontal CCDs 39, the processing speed can be further increased.

Neither a circuit nor a wire is provided in a region along a vertical demarcation line 36. This region is a channel stop region, and the chip 53 can be cut along the region 36. In the present embodiment, since the width of a blank region along the demarcation line 36 is larger than the CCD pitch in the image capturing area 31, the pixel pitch is wider in the parts sandwiching the demarcation line 36 than in the other parts. However, in image sensors used in research fields such as astronomy, unlike in general-purpose image sensors, even if such pixel pitch discontinuity occurs to some extent, no significant problem arises with image analysis.

Figure 4:
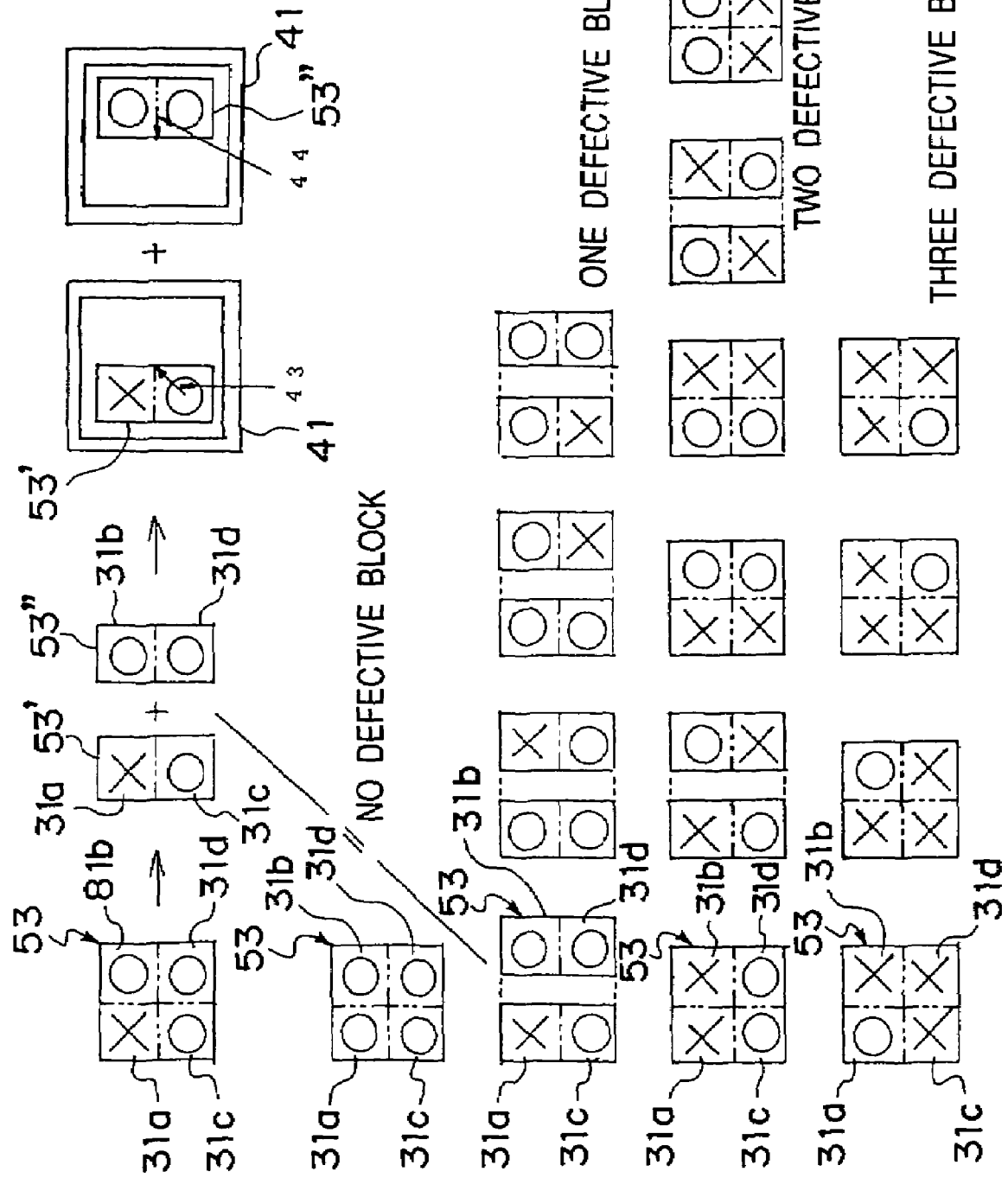
FIG. 4 is a schematic view for explaining defect patterns, cutting patterns of the chip, and chip-package combinations.

FIG. 4 shows patterns of defects caused in the image capturing area 31 of the chip 53, patterns of cutting of the chip 53, and patterns of attachment of the chip 53 to the package 41. As same as in FIGS. 10 and 11, blocks 31a to 31d having a defect that is critical or makes image capturing impossible are shown by "x", whereas normal blocks 31a to 31d having no such a defect are shown by "○."

For example, when only the upper left block 31a of the image capturing area 31 has a defect, the chip 53 is longitudinally cut along the demarcation line 36, the divided chips 53' and 53" are each attached to the package 41. The attachment positions are the same as those in the case where none of the blocks 31a to 31d has a defect, and therefor no problem arises with bonding.

The chip 53' serves as an image sensor with the number of pixels ¼ that in the case where none of the blocks 31a to 31d has a defect. The chip 53" serves as an image sensor with the number of pixels ½ that in the case where none of the blocks 31a to 31d has a defect. The chip 53" has a rectangular image capturing area elongated in a longitudinal direction.

In the image sensors having the chips 53' or 53", with respect to the number of pixels, the center of the image capturing area is shifted from that in the case where none of the blocks 31a to 31d has a defect. Therefore, in order that the center of the image capturing area coincides with the optical axis (designated by a reference number 60 in FIG. 1) of the incident light ray, it is necessary to shift the attachment position on the package 41 by ½ the width 64 of the blocks 31a to 31d in one or both of horizontal and vertical directions as shown by the arrows 43 and 44 in FIG. 4. This position adjustment can be performed by the mount attacher 55 as described later.

Of the defect patterns shown in FIG. 4, with respect to the four patterns where one of the blocks 31a to 31d has a defect and the two patterns where two of the blocks 31a to 31d have a defect, six patterns in total, two chips 53' and 53" used for separate image sensors can be obtained by cutting the chip 53. The patterns other than these are used without the chip 53 being cut even if any of the blocks 31a and 31d has a defect. For example, when four blocks 31a to 31d have a defect, the chip 53 can be used as an image sensor ¼ in the number of pixels by attaching it to the package 41 without cutting it. Even when two chips can obtained by cutting the chip 53 as described above, the chip 53 can be used as one chip without being cut.

Chips having rectangular image capturing area ½ in the number of pixels include longitudinally elongated ones and laterally elongated ones. However, for example, by attaching a holder to a side part and a lower part of the main body of the image capturing apparatus to form an exterior ornament so that the user does not become aware of the length and the width, no problem arises in practical uses.

Next, the mount attacher 55 will be described.

As shown in FIG. 2, the mount 54 with the image sensor 52 is attached to the image capturing apparatus main body with three screws 61. Nine screw holes 62 are provided for each screw 61. The longitudinal and lateral intervals (pitches) 63 between the screw holes 62 are ½ the longitudinal and lateral width 64 of the blocks 31a to 31d. Therefore, by changing the attachment position of the mount 54, the position of the image capturing area can be changed by ½ the longitudinal and lateral width 64 of the blocks 31a to 31d. Consequently, the coincidence between the center of the image capturing area and the optical axis 60 of the incident light is obtained irrespective of the presence or absence of defects and the defect pattern of the blocks 31a to 31d and irrespective of whether the chip is cut or not. The coincidence between the center of the image capturing area and the optical axis 60 of the incident light may be obtained by moving the lens 51 with respect to the image sensor 52 with fixed position of attachment of the image sensor 52 to the image capturing apparatus main body.

When an image captured by the image capturing apparatus of the present embodiment is displayed on the display as it is, the image may be displayed only in the area half or ¼ the entire area of the display screen. However, since most of the recent image processing software programs have a function of displaying a part of an image so as to be enlarged on the entire screen, no problem arises in practical uses by using such a program.

In the image capturing apparatus of the present embodiment, for any defect pattern, by cutting the chip 53 and attaching the image sensor 52 to the image capturing apparatus main body by shifting it by ½ the width 63 of the blocks 31a to 31b, all of the blocks 31a to 31b with no defect of the chip 53 can be effectively used while the basic performance such as the transfer rate is maintained, so that the real yield rate can be improved.

The same image capturing apparatus main body and package can be used irrespective of the presence or absence of defects and the defect pattern. Consequently, cost increase due to the manufacture of different types of image capturing apparatus main bodies and packages can be suppressed, so that the manufacturing cost per image capturing apparatus is significantly reduced.

For users, it can be performed to purchase an image capturing apparatus having an image sensor ¼ in the number of pixels first, additionally purchase an image sensor of the full pixel size later when it can be afforded and use the image sensor in the same image capturing apparatus. For example, image capturing apparatuses for scientific and technological measurements are used for a much longer period of time than general video cameras. In such a case, increasing the performance of the apparatus step by step brings about significant advantages to scientific technicians performing research with limited annual budgets.

Second Embodiment

Figure 5:
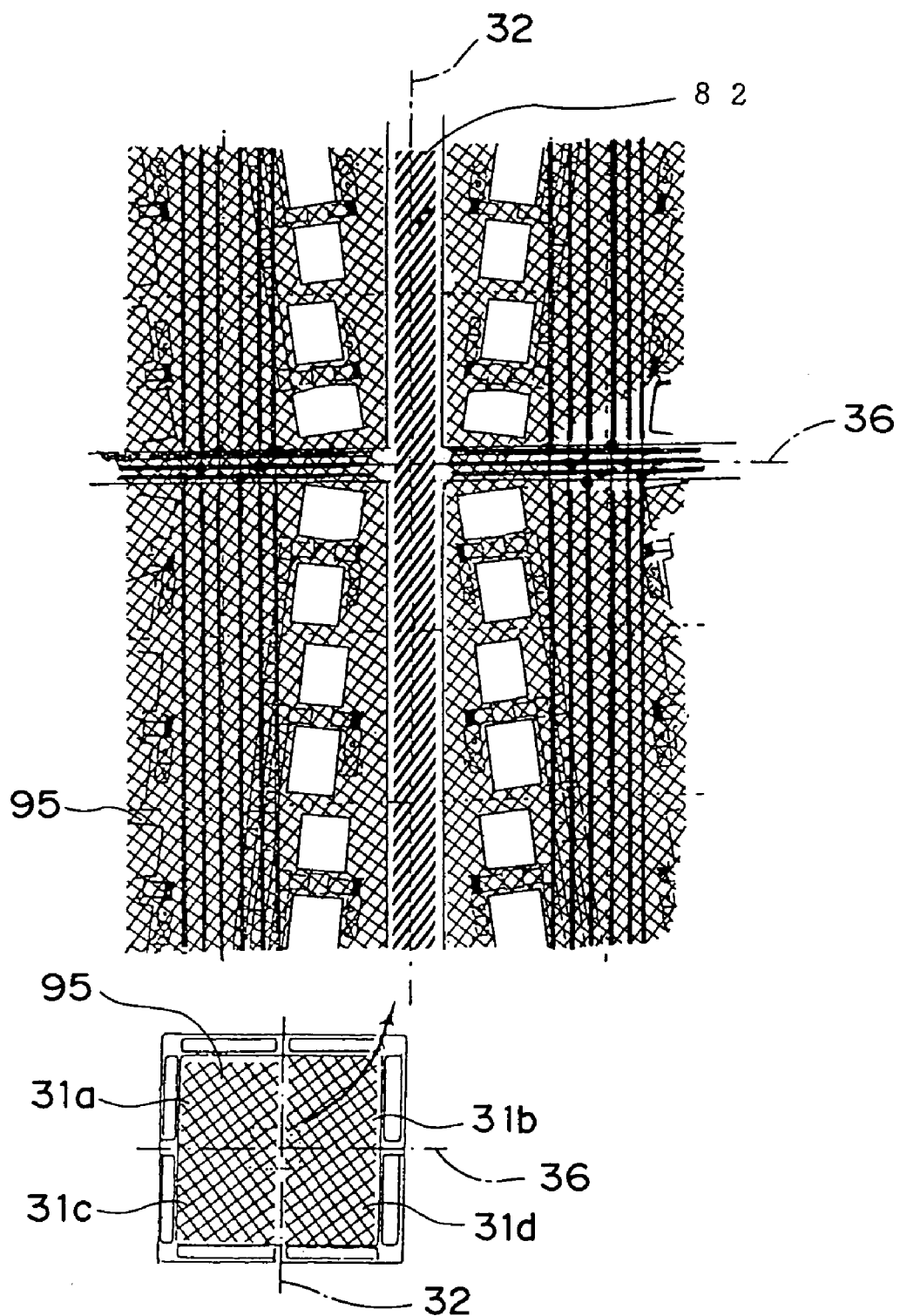
FIG. 5 is a front view showing an image sensor of a second embodiment.
Figure 6:
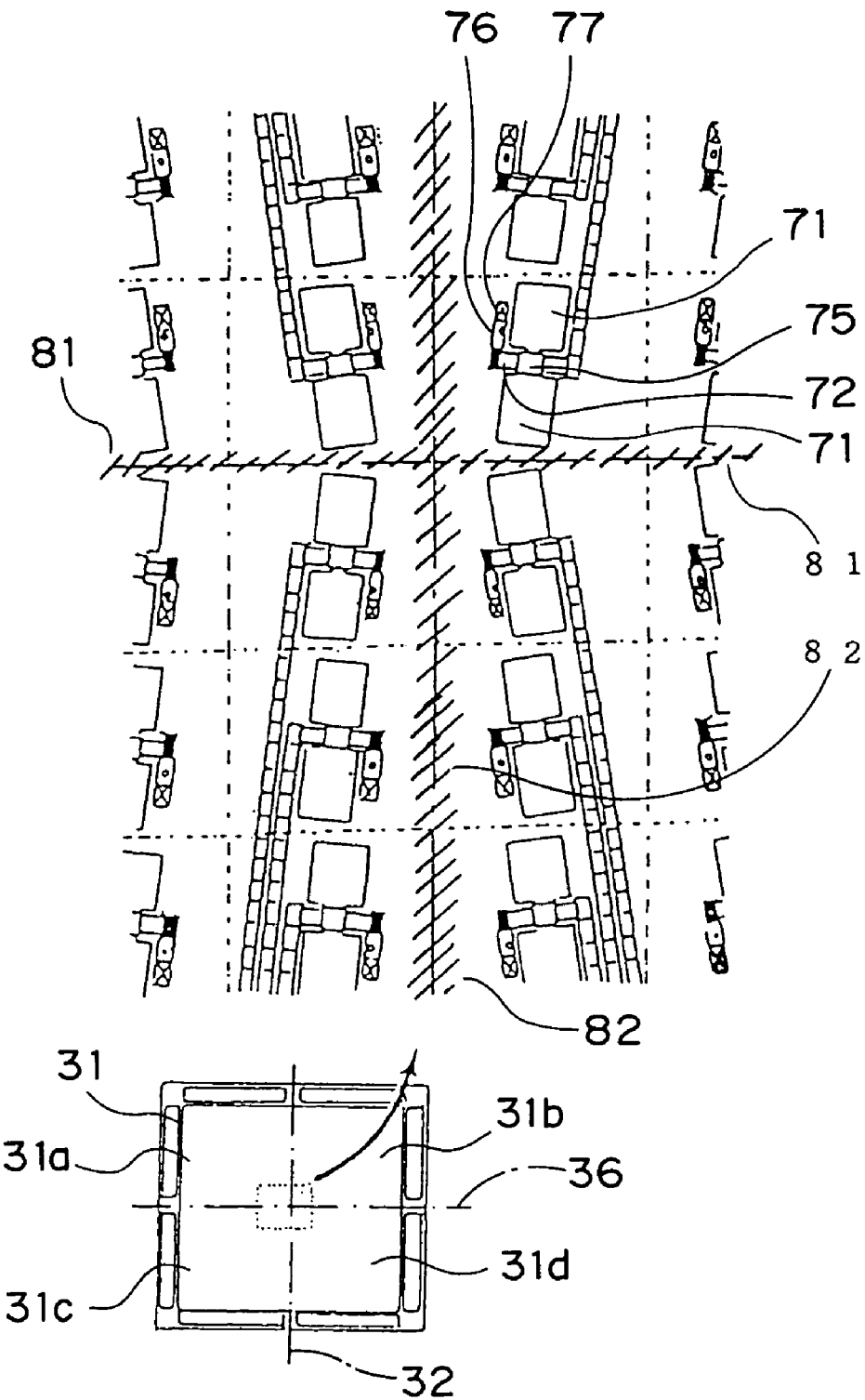
FIG. 6 is a front view showing the image sensor of the second embodiment in a condition where a light intercepting film is removed.
Figure 7:
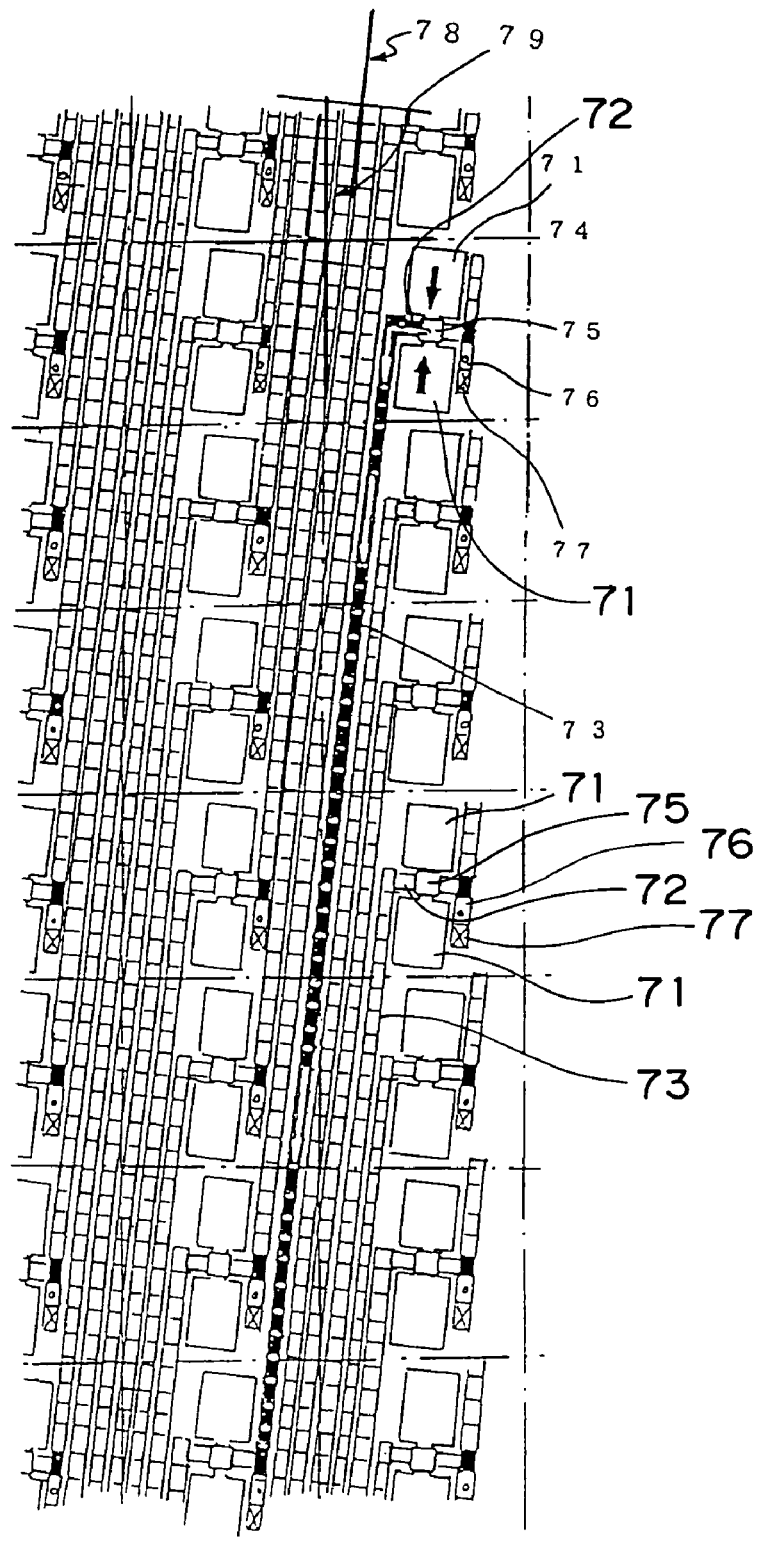
FIG. 7 is a partial enlarged front view showing the image sensor of the second embodiment.

FIGS. 5 to 7 show a second embodiment of the present invention. The second embodiment is different from the first embodiment only in the structure of the chip of the image sensor. The structures of the package and the mount attacher are the same as those of the first embodiment.

As shown in FIG. 5, the image capturing area 31 is covered with a light intercepting film 95 made of metal. Windows for passing light are formed in parts of the light intercepting film 95 corresponding to photodiodes 71.

The blocks 31a to 31d each comprise an in-situ storage image sensor. As shown in FIG. 7, the charges generated at the photodiodes 71 are transmitted to CCD transfer paths 73 through input gates 72, and transferred over the CCD transfer paths 73 downward in a slanting direction. Moreover, charge collecting wells 74, drain gates 75, amplifiers 76 and read-out circuits 77 are provided. The CCD transfer paths 73 performa also as image information (charges) recording means, so that charges corresponding to the image information of preceding tens of steps before from a certain point of time are accumulated. In other words, during image capturing, charges are accumulated on the CCD transfer paths 73 by parallel processing of all the pixels without read out to the outside of the image sensor. The charges accumulated on the CCD transfer paths 73 can be read out to the outside of the image sensor via the read-out circuits 77.

A characteristic of in-situ storage image sensors is that the axis 78 of the CCD transfer paths 73 is slanted with respect to a pixel axis 79 constituted by the photodiodes 77. Owing to this slant, although a linear CCD recording element penetrates to a lower pixel, it does not pass above the photodiode 71 of the lower pixel. Consequently, the CCD transfer paths 73 can be sufficiently extended, so that a multiplicity of continuous images can be recorded.

As shown in FIGS. 5 and 6, long and narrow regions 81 and 82 (shown by hatching) where neither the photodiode 71 nor the CCD transfer path 73 is disposed is present along the demarcation lines 32 and 36 between the blocks 31a to 31d. Of them, the region 82 along the vertical demarcation line 36 is several tens of microns in width, and the chip can be cut along the demarcation line 36. In the region 81 along the horizontal demarcation line 32, CCD driving voltage supply lines 91, 92 and 93 made of a metal are provided. The driving voltages are supplied from the CCD driving voltage supply lines 91, 92 and 93 to the CCD transfer paths 73 via a CCD driving voltage supply wire 96 disposed so as to obliquely cross the CCD transfer paths 73. The point of contact between the driving voltage supply line 96 and the CCD transfer paths 73 is situated at the position of intersection of the driving voltage supply line 96 and the channel stop.

Third Embodiment

Figure 8:
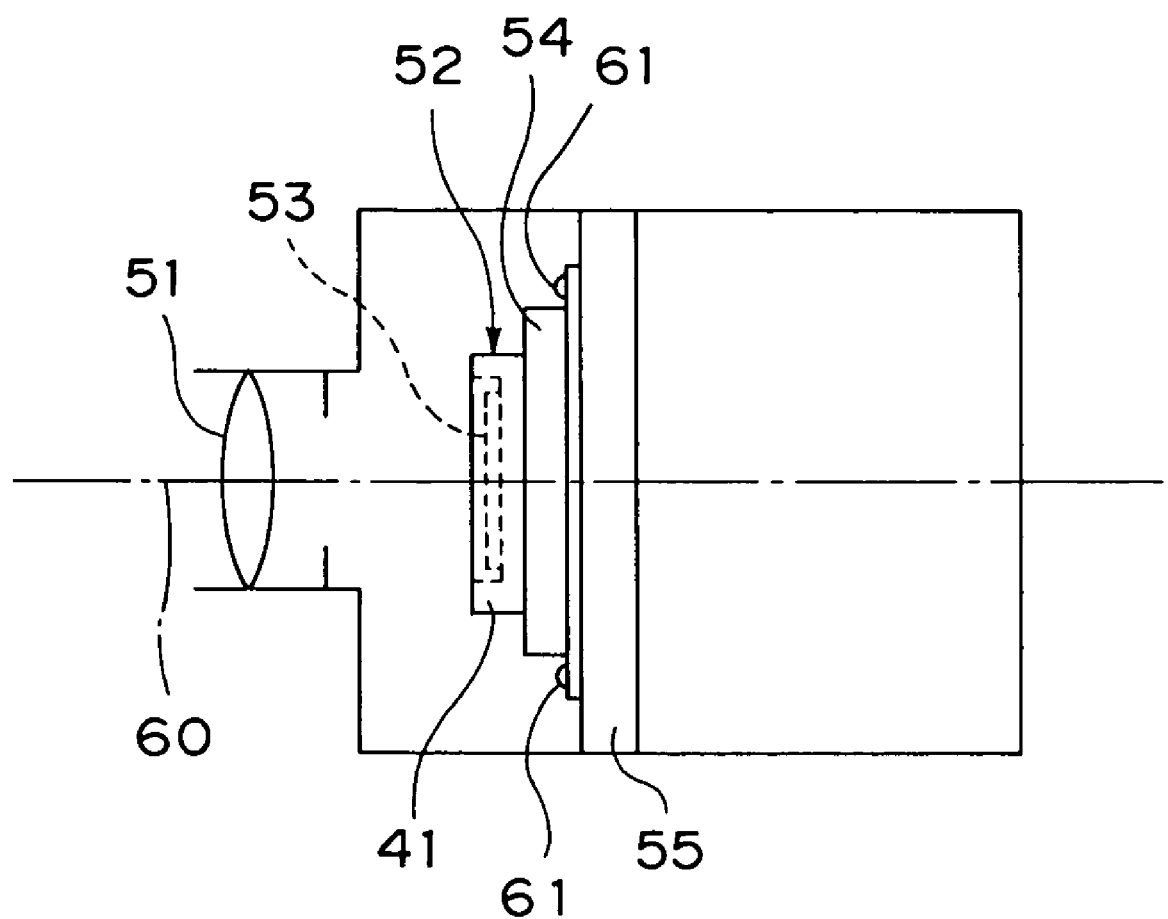
FIG. 8 is a schematic structural view showing an image capturing apparatus of a third embodiment.
Figure 9:
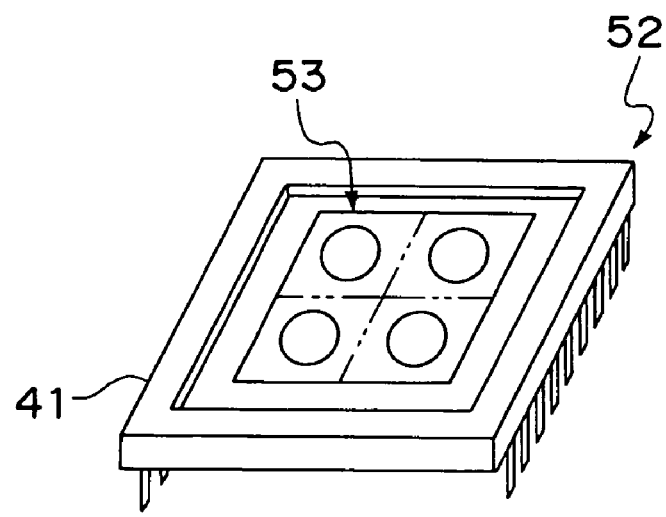
FIG. 9 is a schematic perspective view showing an example of combinations of the chip and package.
Figure 10:
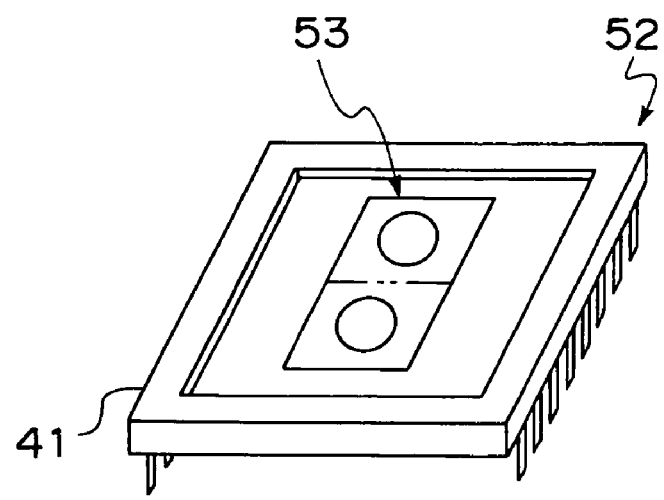
FIG. 10 is a schematic perspective view showing another example of chip-package combinations.
Figure 11:
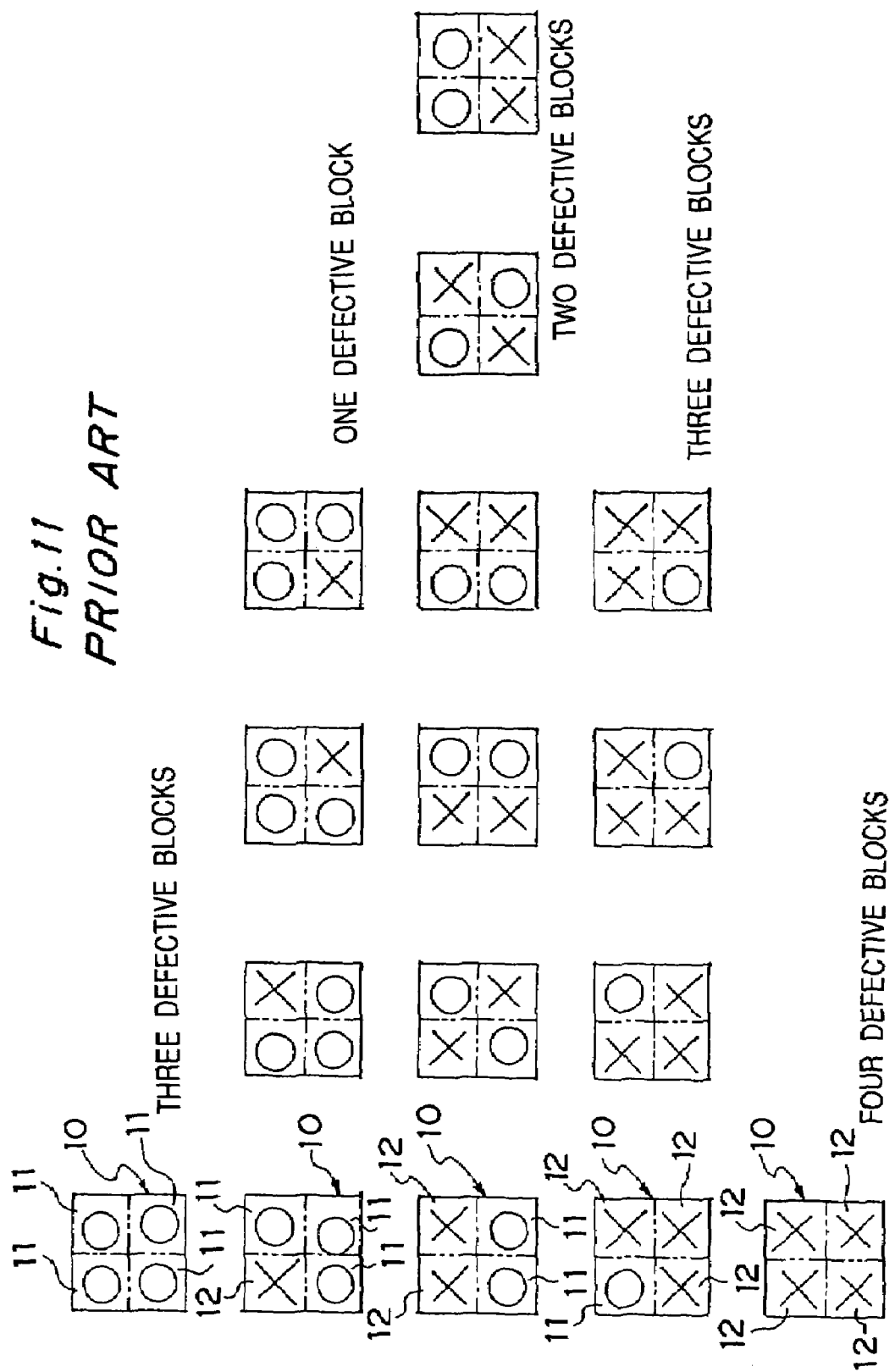
FIG. 11 is a schematic view for explaining defect patterns of the chip with the image capturing area comprising four blocks.
Figure 12:
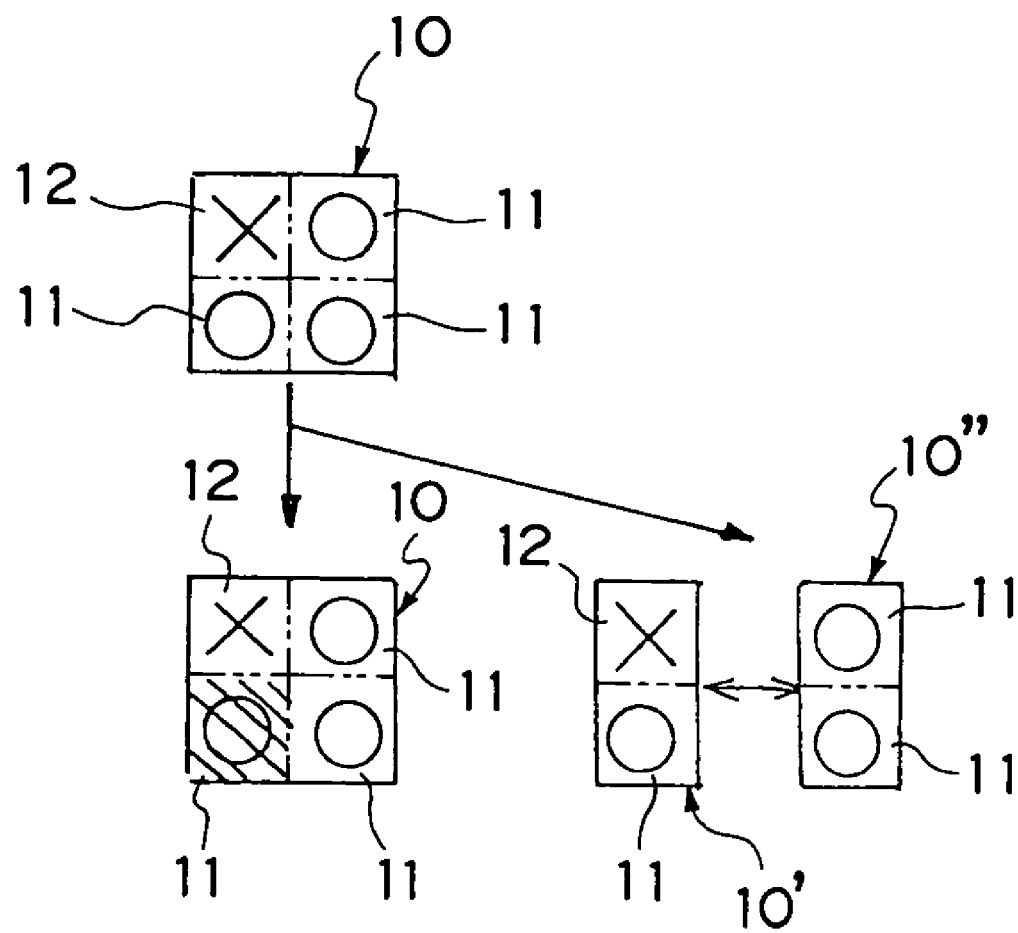
FIG. 12 is a schematic view for explaining a case where one of the four blocks has a defect.

FIGS. 8 to 10 show an image capturing apparatus of a third embodiment of the present invention.

Unlike the first embodiment, the mount 54 of the image sensor 52 is fixed to the image capturing apparatus main body and cannot be position-adjusted. However, as shown in FIGS. 9 and 10, two kinds of packages 41 are provisioned, and the coincidence between the image capturing area and the optical axis 60 is obtained by the position of attachment of the chip 53 to the packages 41.

The package 41 of FIG. 9 is used when none of the blocks 31a to 31b has a defect, and the chip 53 can be attached so that the center of all the blocks 31a to 31d constituting this image capturing area coincide with the optical axis 60. Moreover, the chip 53 and the circuitry on the package 41 can be bonded together.

On the other hand, the package 41 of FIG. 10 is used for a cut chip 53, and the chip 53 can be attached so that the center of the two blocks 31a and 31c constituting the image capturing area coincide with the optical axis 60 of the incident light. The blocks 31a and 31c and the circuitry on the package 41 can be bonded together. In this case, some of the pins of the package 41 are dummy pins. In FIG. 10, a sufficient space may be provided on both sides of the chip 53 on the package 41 so that the chip 53 can be attached to the package 41 without being cut so that the center of the blocks being used coincide with the optical axis 60.

In the image capturing apparatus of the third embodiment, by using packages 41 in accordance with the presence or absence of defects and the defect pattern of the chip 53, all the blocks 31a to 31b having no defect can be effectively used, so that the real yield rate can be improved.

The present invention is not limited to the above-described embodiments and various modifications are possible.

The image sensor may be either one for monochrome image capturing or one for color image capturing having a color filter array. Moreover, the image sensor may be provided with a light intensifier such as a microlens or an image intensifier, or a layer emitting visible light to electromagnetic waves other than visible light and particles.

Moreover, the size of the image sensor is not limited to the one four times the area of the blocks. The image sensor may comprise six blocks of 2×3 or may be larger than that.

While the present invention is suitable for a case where the image capturing area of the image sensor comprises a plurality of blocks, it is also applicable to a case where the image capturing area is not divided into blocks. Specifically, by providing a position adjusting mechanism that changes the relative positions of the image capturing area of the image sensor and the optical axis of the incident light directed from the optical system to the image capturing area, and obtaining coincidence between the center of the parts of the image capturing area having no defect or having few defects and the optical axis of the incident light, a large-size chip can be used irrespective of the presence or absence of defects.

The invention claimed is:

1. An image capturing apparatus comprising:
   an image sensor provided with a chip having an image capturing area and a package to which the chip is attached, said image capturing area including four blocks respectively including a plurality of pixels and forming a grid structure of two lines and two rows, each of the blocks having image information read-out lines;
   an optical system for focusing incident light from an object to be captured on the image capturing area of the image sensor; and
   a position adjustment mechanism for changing a relative position between the image capturing area of the image sensor and an optical axis of the incident light directed from the optical system to the image capturing area, by ½ of one or both of a longitudinal and lateral length of the blocks determined by the number and position in the grid of operational blocks of the plurality of blocks, such that the center of the image capturing area of operational blocks coincides with the optical axis of the incident light.

2. An image capturing apparatus according to claim 1, wherein the position adjustment mechanism is capable of displacing the image sensor with respect to the optical axis.

3. An image capturing apparatus according to claim 1, wherein the position adjustment mechanism is capable of displacing the optical system with respect to the image sensor.

4. An image capturing apparatus comprising:
   an image sensor provided with a chip having an image capturing area and a package to which the chip is attached, said image capturing area including determined number of blocks at most, each of the blocks having image information read-out lines;
   an optical system for focusing incident light from an object to be captured on the image capturing area of the image sensor;
   an image sensor mount section to which the image sensor is removably attached, wherein a plurality of different packages are provided including a package in which the chip having all the determined number of blocks is attachable so that a center of all the determined number of blocks constituting the image capturing area coincides with an optical axis of the incident light, and another package to which the chip having the blocks of less than the determined number is attachable so that a center of the blocks of less than the determined number constituting the image capturing area coincides with the optical axis of the incident light.

* * * * *